United States Patent [19]

Dabat et al.

[11] Patent Number: 4,639,178
[45] Date of Patent: Jan. 27, 1987

[54] MACHINE PERMITTING THE REMOTE CLOSURE OF DRUMS

[75] Inventors: Robert Dabat, Octeville; Claude Jamet, Equeurdreville, both of France

[73] Assignee: Commissariat a l'Energie Atomique, France

[21] Appl. No.: 570,355

[22] Filed: Jan. 13, 1984

[30] Foreign Application Priority Data

Jan. 14, 1983 [FR] France .................. 83 00525

[51] Int. Cl.⁴ .............................................. B21D 51/30
[52] U.S. Cl. ........................................ 413/26; 413/45
[58] Field of Search .................. 413/26, 45, 47, 48, 413/78

[56] References Cited

U.S. PATENT DOCUMENTS 2,536,055  1/1951  Heinle .................................. 413/45
3,674,605  7/1972  Baumann ............................. 413/26

FOREIGN PATENT DOCUMENTS 2287092  4/1976  France .
2428892  1/1981  France .
64047  10/1971  Luxembourg .

Primary Examiner—W. D. Bray
Attorney, Agent, or Firm—Handal & Morofsky

[57] ABSTRACT

Machine for closing drums within a pool, wherein it comprises a telescopic pole having at its lower end a gripping head, handling means for moving the latter between a bottom position in the pool and a top position above the pool, transfer means for transferring a cover beneath the gripping head when the latter is in the top position, and control means for putting into action the means for attaching the cover to the drum, the handling means, transfer means and control means being positioned above the pool and the gripping head carrying the connection means for the control means and attachment means.

The invention also relates to a drum cover to be fitted with the aid of such a machine.

10 Claims, 3 Drawing Figures

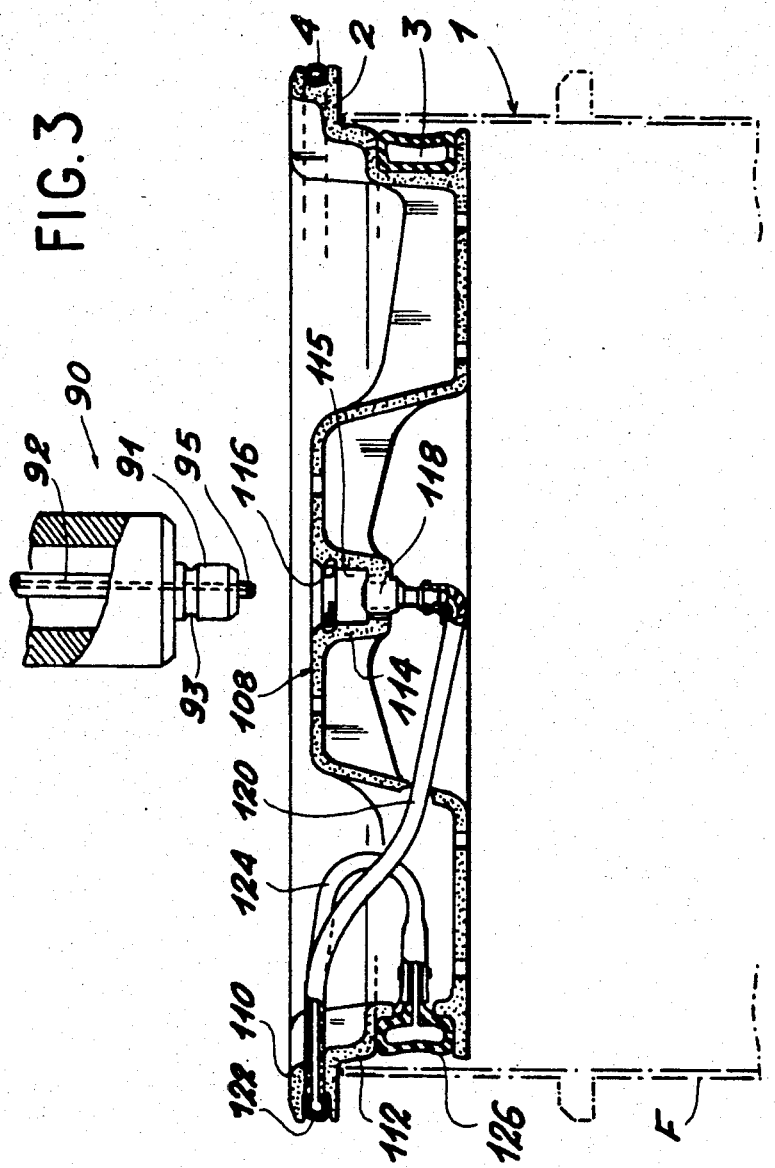

MACHINE PERMITTING THE REMOTE CLOSURE OF DRUMS

BACKGROUND OF THE INVENTION

The present invention relates to a machine permitting the remote closing of drums for example containing radioactive or contaminated materials within a pool, as well as to a drum cover for fitting by means of such a machine.

The transfer of radioactive or contaminated materials between a high activity pool and an outer site, such as a storage site, generally takes place in drums. During this transfer, the drums circulate in a sloping channel, in such a way that they are positioned substantially horizontally. If it is wished to fill them completely and therefore save the maximum amount of time during the transfers, it is indispensable to equip them with covers. Moreover, bearing in mind the nature of the transferred product, the fitting and removal of the covers can only take place in a remote manner.

A machine is known for closing the drums making it possible to solve this problem. This machine is brought into the actual pool just above the top of the drums to be closed and it comprises means for locking the covers on the drums by clipping. Following the transfer, the drums are opened by declipping.

However, this machine is not completely satisfactory, mainly for the following two reasons.

(1) As the machine has to be brought very close to the drums containing the radioactive or contaminated materials, it is submerged and is therefore itself contaminated.

(2) During their transfer, the drums are subject to impacts and are slightly deformed. However, this deformation is sufficient to prevent the fitting of the covers after a certain number of transfers.

SUMMARY OF THE INVENTION

The present invention relates to a machine for closing drums within a pool and which does not suffer from the disadvantages of the known machine. It is almost entirely located above the pool, whilst using a method making it possible to ensure the closure of the drums, even when they are deformed.

The present invention therefore relates to a machine for closing drums within a pool, wherein it comprises a telescopic pole having at its lower end a gripping head, handling means for moving the latter between a bottom position in the pool and a top position above the pool, transfer means for transferring a cover beneath the gripping head when the latter is in the top position, and control means for putting into action the means for attaching the cover to the drum, the handling means, transfer means and control means being positioned above the pool and the gripping head carrying the connection means for the control means and attachment means.

In such a machine, only the lower part of the telescopic pole carrying the gripping head is submerged when it is in the bottom position in order to ensure the closing of a drum, the remainder of the machine being entirely above the pool, so that it is not contaminated.

According to a preferred embodiment of the invention, the means for transferring a cover beneath the gripping head comprise a barrel, means for placing a cover on the barrel and means for rotating the barrel, the latter also having at least one opening permitting the passage of a cover when the opening is placed below the gripping head and the latter is in the top position.

The means for placing a cover on the barrel preferably comprise a magazine which can contain a certain number of stacked covers, a guillotine door or gate able to close the lower part of the magazine and means for holding back the other covers when the cover in the lower part of the magazine drops onto the barrel after opening the door or gate.

According to another feature of the invention, the means for locking the cover on the barrel comprise at least one inflatable joint carried by the cover, the control means being pneumatic control means and the connection means incorporating self-sealing pneumatic couplings.

As a result of this latter feature, it is obvious that the closing of the drums can be carried out even when they are deformed after a certain number of impacts suffered during the successive transfers.

The invention also relates to a drum cover to be fitted by means of a machine having the latter feature. This cover is characterized in that it has on its periphery at least one groove in which is located the inflatable joint and in its central part a self-sealing pneumatic coupling linked with said joint and gripping means able to cooperate with the gripping head of the machine.

Preferably, the inflatable joint is linked with at least one visible part after closing the drum, said part being perforatable by appropriate means when it is wished to open the drum. This visible part can in particular be an O-ring placed on the periphery of a flange formed on the cover. As a result of this feature, the drum can be opened by means of a needle, so matter what the angular position of the drum, provided that the drum is positioned vertically and at a good height.

According to another feature of the invention, the cover has a cavity at the bottom of which is placed the self-sealing pneumatic coupling, the gripping means incorporating a joint placed in said cavity and which can be located in a corresponding groove of the gripping head.

BRIEF DESCRIPTION OF THE DRAWINGS

The invention is described in greater detail hereinafter relative to non-limitative embodiments and with reference to the attached drawings, wherein show:

FIG. 3 in even larger scale, a cover according to the invention, whose fitting and attachment to the drum end is brought about by the machine of FIG. 2.

DETAILED DESCRIPTION OF THE INVENTION

Figure 1:
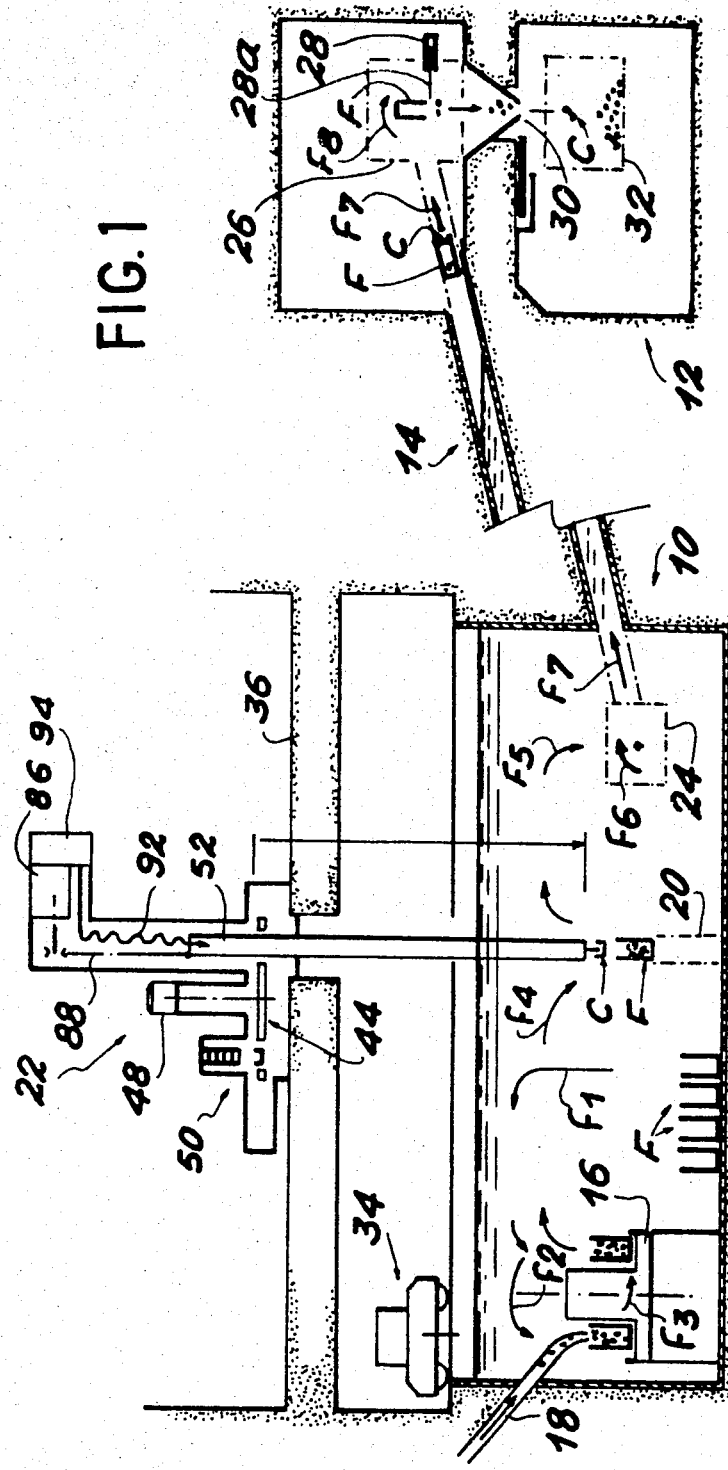
FIG. 1 a diagrammatic sectional view of an installation incorporating a pool in which radioactive or contaminated materials into drums, a storage site communicating with the pool by a sloping channel and the machine according to the invention for closing the drums within the pool.

In order to illustrate a possible application of the machine according to the invention, FIG. 1 shows an installation incorporating a pool 10, a storage site 12 and a sloping channel 14 by which it is possible to transfer drums containing radioactive or contaminated materials from pool 10 to storage site 12.

More specifically, empty drums F are stored in the vertical position in the bottom of pool 10. When necessary, these drums are moved one by one onto a member 16 arranged in the pool and as indicated by arrow $f_1$ in FIG. 1, the rotation of member 16 successively brings each empty drum below a chute 18 (arrow $f_2$). Chute 18 is used for filling the drums with a radioactive or contaminated product.

Following another rotation of member 16 indicated by arrow $f_3$ in FIG. 1, the filled drum is brought, whilst still in pool 10 (arrow $f_4$) onto an appropriate positioning device 20. At this time and according to the invention, drum F is closed by a cover C using the machine 22 according to the invention, which will be described in greater detail hereinafter.

The filled and closed drum is then transferred as indicated by arrow $f_5$ into a starting plug 24 also located within pool 10 and linked with the sloping channel 14. Within plug 24, the drum is inclined into a horizontal position as indicated by arrow $f_6$. Via channel 14, the drum leaves pool 10 (arrow $f_7$) and level with the storage suite 12 issues into an arrival means 26, where it is again tilted into the vertical position (arrow $f_8$), the cover being placed downwards.

Means 28 in arrival means 26 ensure, in the manner to be shown hereinafter, the opening of the drum and the simultaneous dropping of the cover and the radioactive or contaminated products into a silo 30, which e.g. issues above a container 32 at site 12.

Obviously, the various movements imparted to drum F and symbolized by arrows $f_1$ to $f_8$ in FIG. 1 can be obtained with the aid of any known means. Thus, the means for carrying out movements $f_1$, $f_4$ and $f_5$ can be constituted e.g. by a travelling crane 34.

According to the invention, it can be seen in FIG. 1 that the machine 22 for closing the drums within pool 10 is placed almost entirely above the slab 36 over pool 10.

Figure 2:
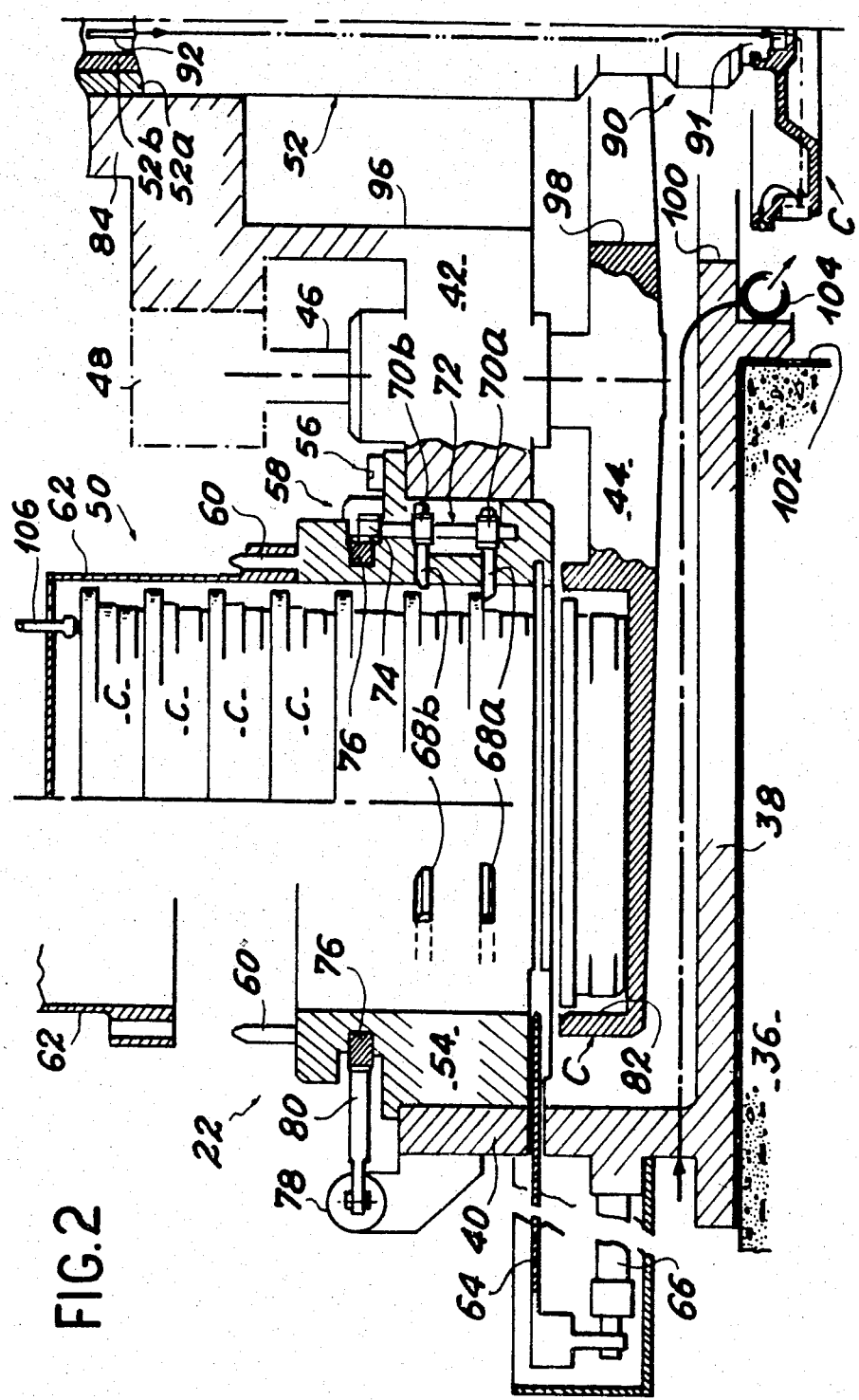
FIG. 2 a larger scale sectional view of part of the drum closing machine of the installation of FIG. 1.

More specifically and as illustrated in FIG. 2, machine 22 rests on slab 36 by a base plate 38 on which is welded a cylinder 40, sealed in its upper part by a thick horizontal plate 42. Within the thus defined space between base plate 38, cylinder 40 and plate 42 is mounted in rotary manner a conveyor 44 constituted by a plate suspended on a vertical shaft 46 traversing plate 42. Shaft 46 bears on the upper face of plate 42 by means of a not shown vertical bearing, which can be dismantled from the outside. The rotation of plate 42 is controlled by a motor 48, located at the upper end of shaft 46.

Conveyor 44 is used for transferring one by one covers C from a magazine 50 and up to a vertical telescopic pole 52 positioned above the positioning device 20 and by means of which the covers are then lowered one by one into the pool and fixed to drums F.

The cover magazine 50 is fixed to plate 42 in an eccentric manner relative to drum shaft 46, thus defining for the same a cover supply station. More specifically, magazine 50 comprises a cartridge 54 dismantlably fixed to plate 42, e.g. by means of screws 56. Cartridge 54 is mounted within an opened bore formed in plate 42, as shown most clearly in FIG. 2 and has in its thickness a distribution assembly 58 making it possible to lower covers C one by one in the manner to be shown hereinafter. On its upper face, cartridge 54 has three guidance columns 60 on which is received the top 62 of the magazine, which forms then with cartridge 54 a confinement enclosure within which can be located a certain number of horizontally stacked covers C (there are 7 covers in the represented variant).

At its lower end, i.e. below plate 42 cartridge 54 is provided with a horizontal guillotine gate or door 64, controlled by a jack 66 positioned outside cylinder 40 and consequently traversing the latter in such a way that it can disengage the lower end of cartridge 54, when a cover C has to be deposited on conveyor 44.

In the variant of FIG. 2, the distribution assembly 58 which, with the guillotine gate 64 makes it possible to lower covers C one by one onto conveyor 44, comprises, at at least three points of the ring periphery, two catches 68a, 68b located in the thickness of cartridge 54 at two different levels. Preferably, each cover C comprises a flange (see FIG. 3) 110 and catches 68a, 68b are disposed respectively level with the lower face of flange 110 of the two covers C positioned below the stack contained in the magazine. Catches 68a and 68b can slide horizontally in their recess, in such a way that one of them projects within the cylinder 40 and thus by means of its flange retains the corresponding cover C, whilst the other is moved back into cartridge 54.

The simultaneous displacement of catches 68a and 68b is ensured for each of these catches by a cam 70a, 70b respectively. The cams corresponding to two superimposed catches are both carried by a vertical shaft 72 located in cartridge 54. Shaft 72 carries at its upper end a pinion 74, which meshes with a crown gear 76, received in rotary manner on ring 54 above plate 42. The rotation of ring 76 is controlled by a jack 78 mounted on cylinder 40, e.g. by means of a rod 80. This rotation simultaneously controls each group of two members 70a, 70b.

The support tube 84 for telescopic pole 52 is also fixed to the upper face of plate 42 at a point displaced with respect to the pivot shaft 46 of conveyor 44, so as to define a station for transferring covers into the pool and for closing the drums. For example, this station can be displaced by 120° relative to magazine 50, which then leaves space for a third station, such as a tooling or intervention station, as will be shown hereinafter. In order that the axis of the cover moved by conveyor 44 up to pole 52 coincides with the axis of the latter, the axes of magazine 50 and pole 52 are positioned equidistantly of the rotation axis of conveyor 44.

The telescopic pole 52 is constituted by two coaxial vertical tubes 52a, 52b, which slide within the support tube 84 under the action of a motor 86 (FIG. 1) located in the upper part of support tube 84. Motor 86 and the reduction gear associated therewith control the raising of pole 52 by means of two chains connected in parallel and indicated diagrammatically at 88 in FIG. 1. The chains 88 are protected by a not shown torque limiter. The assembly is dimensioned in such a way that the chains 88 are never submerged. The telescopic pole 52 is lowered by gravity.

At its lower end, the inner tube 52b of the pole carries a gripping head 90 also used for controlling the attachment of the cover on the drum. This gripping head 90 essentially comprises a cylindrical part 91, which penetrates a corresponding cavity 115 (FIG. 3) positioned in the centre of the cover, gripping being effected by means of an O-ring 116 mounted in cavity 115 and fitted into a groove 93 formed in cylindrical part 91. As will also be shown hereinafter, the means for attaching the cover to the drum are pneumatic means and the cylindrical part 91 of gripping head 90 consequently has at its end a self-sealing male pneumatic coupling 95. Coupling 95 is linked with a pipe 92 within the pole 52 and whose other end is connected to a compressor 94 mounted at the upper end of support tube 84.

When the pole 52 is in the top position, gripping head 90 is positioned above conveyor 44. Thus, plate 42 has at this level a recess 96 in which can be received a cover carried by the gripping head.

In order to permit the lowering of pole 52 to which is attached a cover C, conveyor 44, base plate 38 and slab 36 each has a passage 98, 100, 102 respectively. The dimensions of these passages are larger than those of the cover C and passages 100 and 102 are arranged coaxially relative to pole 52. Thus, when the axis of barrel passage 98 coincides with the axis of pole 52, the latter can be lowered to bring cover C onto drum F and close the latter in the manner illustrated in FIG. 1.

An operating cycle of the machine according to the invention will now be described with reference to FIGS. 1 and 2.

If it is assumed that the cover magazine 50 is full, the distribution of the covers onto conveyor 44 takes place in the following way. After installing the machine, guillotined gate 64 closes the lower end of cartridge 54 and the distribution assembly 58 occupies the position shown in FIG. 2 in which the catches 68a project into assembly 54, whilst catches 68b are retracted. Cover C positioned lowermost the stack is then maintained in place by catches 68a.

If it is wished to place a cover on conveyor 44, which to this end has a reception impression 82 displaced by 120° relative to passage 98 if the distribution and closing stations of the drums are themselves displaced by 120°, jack 78 is firstly actuated so as to simultaneously ensure the retraction of the lower catches 68a and the bringing into the projecting position within cartridge 54 of the upper catches 68b. The latter then ensure the maintaining in place of the penultimate cover starting from the bottom of the pole, whilst the bottom cover is only held in place by guillotine gate 64. The latter can then be disengaged from cartridge 54 under the action of jack 66, so that the cover C below the pile drops into impression 82 of conveyor 44.

Jack 66 is then actuated so as to again seal the lower end of cartridge 54 by guillotine gate 64. The remainder of the pile of covers C contained in the magazine is then lowered by one unit by actuating jack 78. The cover then at the bottom of the pile is in turn flush with guillotine gate 64.

Simultaneously, with the two latter operations and after a cover has been deposited in impression 82 provided for this purpose in the barrel, the latter rotates under the action of a motor 48, so as to bring said cover C below the gripping head 90, the pole 52 being in the top position. The lowering by gravity of pole 52 brings about the automatic attachment of cover C to the gripping head. Automatic attachment takes place between the O-ring 116 carried by the cover and groove 93.

Pole 52 is then raised into the top position under the action of motor 86, so as to raise cover C above impression 82. A new rotation of conveyor 44 controlled by motor 48 then brings the barrel passage 98 below pole 52, in such a way that the lowering of the latter into pool 10 can take place. This lowering takes place by gravity until cover C is located in the open end of the drum to be closed. The pneumatic closure of the drum is then controlled with the aid of a compressor 94.

Pole 52 is then automatically disconnected by the cover by pulling, and is raised under the action of motor 86. During the raising operation, a cleaning ramp 104 mounted on the machine base plate 38 level with slab 36 makes it possible to rinse pole 52.

Thus, contamination of the machine 22 is reduced to a minimum. It should also be noted that the machine 22 is fluid-tight, particularly at pole 52 and that the support tube 84, plate 42, cylinder 40 and base plate 38 are made from thick carbon steel (50 to 60 mm), in order to ensure the biological protection.

The initial position is again reached and a new cycle can be undertaken. When all the covers C in magazine 50 have been passed from the latter to the interior of pool 10 for sealing a drum F, the portion 62 of the magazine is disengaged in the manner shown in the left-hand part of FIG. 2, in such a way that the magazine can again be filled by means of appropriate handling means. The control of the filling state of magazine 50 takes place by a counting rod 106 carried by the portion 62 of the magazine.

Obviously, the different operations can either be carried out automatically or manually, each operation then being controlled independently of the others.

A more detailed description will now be given of the structure of the covers for use with machine 22 according to the invention and with reference to FIG. 3. The covers C are constituted by a stamped or moulded plate 108 preferably of a light alloy, more particularly defining a flange 110 which can pass over the end of the drum, a cylindrical part 112 which can be fitted into said end and a central female part 114 able to receive said cylindrical part of the pole gripping head 90. The female part 114 is obviously open towards the outside when the cover is mounted on the drum and, as was shown hereinbefore, it has an O-ring 116 projecting towards the interior of part 114, in the vicinity of the open end thereof. As has been shown, O-ring 116 is used for the gripping of the cover by the pole, the cylindrical part of the gripping head 90 having a groove 93 for this purpose.

In its centre and in the bottom of the female part 114, cover C carries a self-sealing female pneumatic coupling 118 able to cooperate with the self-sealing coupling 95 mounted on the end of gripping head 90.

A flexible tube 120 is connected to coupling 118 at one of its ends and communicates with an O-ring 122 by its other end. O-ring 122 is located in a groove formed in the periphery of flange 110, in such a way that it remains accessible when cover C is mounted on drum F.

Another flexible tube 124 links the O-ring 122 with an inflatable joint 126 located in a groove formed in the cylindrical part 112 of the cover. Inflatable joint 126 has a substantially rectangular and large cross-section (e.g. 4×10 mm). It ensures the closing of the drum by its outer face bearing against the inner face of the opening of the latter.

The use of an inflatable joint makes it possible to easily bring about the remote closing of the drum and to provide a relatively large clearance between the cylindrical part 112 of the cover and the internal diameter of the drum opening, because the deformation of the joint during its inflation ensures the necessary closure or sealing.

On referring once again to the description of machine 22, it is apparent that when cover C is brought onto drum F with the aid of pole 52, the self-sealing couplings of gripping head 90 and the cover link pipe 92 with flexible tube 120, in such a way that joint 126 can be inflated with the aid of compressor 94. As soon as inflation is ended, the self-sealing coupling 118 closes and the closure of the drum with the aid of the cover is ensured throughout the subsequent transportation of the drum, particularly in the sloping channel 14 (FIG. 1).

On referring once again to FIG. 1, it can be seen that the opening of the drum level with the storage station 12 can easily be carried out in means 26 after the drum has been positioned vertically with the cover pointing downwards. As a result of the visible O-ring 122, the latter can be perforated remotely using a remotely controlled device 28, following a simple heightwise positioning of the drum, the angular position having no importance because the ring is visible over the entire periphery of the cover. Thus, device 28 can be constituted by a pneumatic jack located outside means 26 and actuating a punch 28a, which perforates O-ring 122. When the latter has been perforated, joint 126 deflates and the cover and the contents of the drum, drops into silo 30, as has been described hereinbefore.

On cover C, the flexible tubes 120 and 124, as well as the O-ring 122 can be realised by means of the same tube. Moreover, tubes 120 and 124, O-ring 122 and joint 126 are preferably made from nylon-sheathed silicone.

The invention is obviously not limited to the embodiments described herein and numerous variants can be made thereto without passing beyond the scope of the invention. It should be noted that machine 22 preferably has a tooling or intervention station displaced by 120° relative to the pole and the magazine. Such a station can be equipped with a handling mechanism making it possible to carry out the various operations and a shielded enclosure can be tightly attached thereto in order to permit the evacuation of highly contaminated and irradiated parts, such as the attachment and inflation head 90.

What is claimed is:

1. A machine for closing drums within a pool, wherein said machine comprises a telescopic pole having at its lower end a gripping head, handling means for moving the latter between a bottom position in the pool and a top position above the pool, transfer means for transferring a cover beneath the gripping head when the latter is in the top position, and control means for putting into action means for attaching the cover to the drum, the handling means, transfer means and control means being positioned above the pool and the gripping head carrying connection means for the control means and attachment means.

2. A machine according to claim 1, wherein the means for transferring a cover beneath the gripping head comprise a conveyor, means for placing a cover on the conveyor and means for rotating the conveyor, the latter also having at least one opening permitting the passage of a cover when the opening is placed below the gripping head and the latter is in the top position.

3. A machine according to claim 2, wherein the means for placing a cover in the conveyor comprise a magazine adapted to contain a certain number of stacked covers, a guillotine door or gate able to close the lower part of the magazine and means for holding back the other covers when the cover in the lower part of the magazine drops onto the conveyor after opening the door or gate.

4. A machine according to claim 1, wherein the telescopic pole slides vertically in a support tube carrying at its upper end the handling means and control means.

5. A machine according to claim 1, wherein the gripping head has a cylindrical part with a groove in which can be fitted an O-ring located in a cavity of the cover and able to receive the cylindrical part, so as to bring about the gripping of the cover.

6. A machine according to claim 1, wherein the means for attaching the cover to the drum comprises at least one inflatable joint carried by the cover control means being pneumatic control means and the connection means incorporating self-sealing pneumatic couplings.

7. A machine as in claim 6, further comprising a drum cover to be fitted, said cover having on its periphery at least one groove in which is located the inflatable joint and in its central part a self-sealing pneumatic coupling linked with said joining and gripping means and able to cooperate with the gripping head of the machine.

8. A machine according to claim 7, wherein the inflatable joint is linked with at least one visible part after the closing of the drum, said part being perforatable by appropriate means when it is wished to open the drum.

9. A machine according to claim 8, wherein the visible part is an O-ring located on the periphery of a flange formed on the cover.

10. A cover according to claim 7, wherein the cover has a cavity at the bottom of which is disposed the self-sealing pneumatic coupling, the gripping means incorporating a joint located in said cavity and which can be positioned in a corresponding groove of the gripping head.

* * * * *